Figure 3:
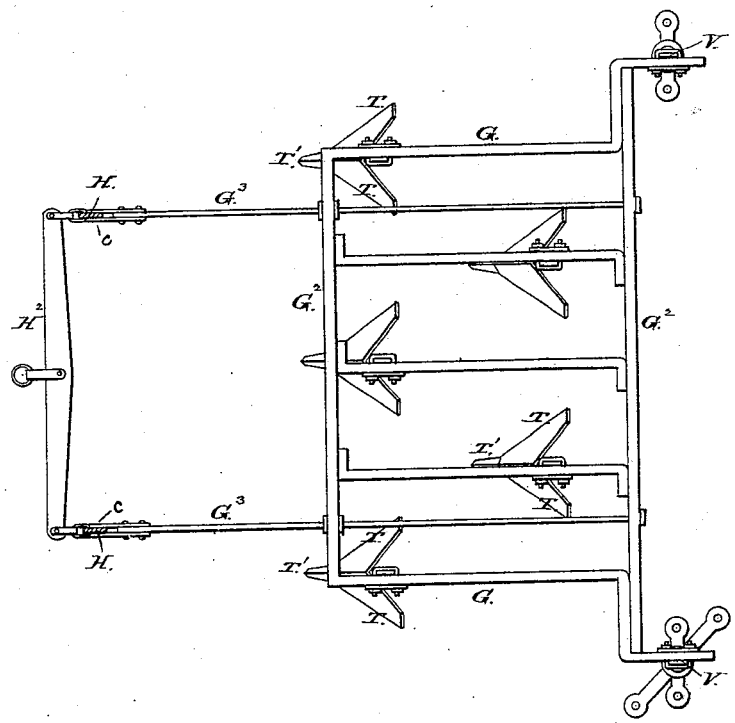

(No Model.) 2 Sheets—Sheet 1.
W. DICKINSON.
COMBINED SEEDING AND CULTIVATING MACHINE.
No. 282,614. Patented Aug. 7, 1883.
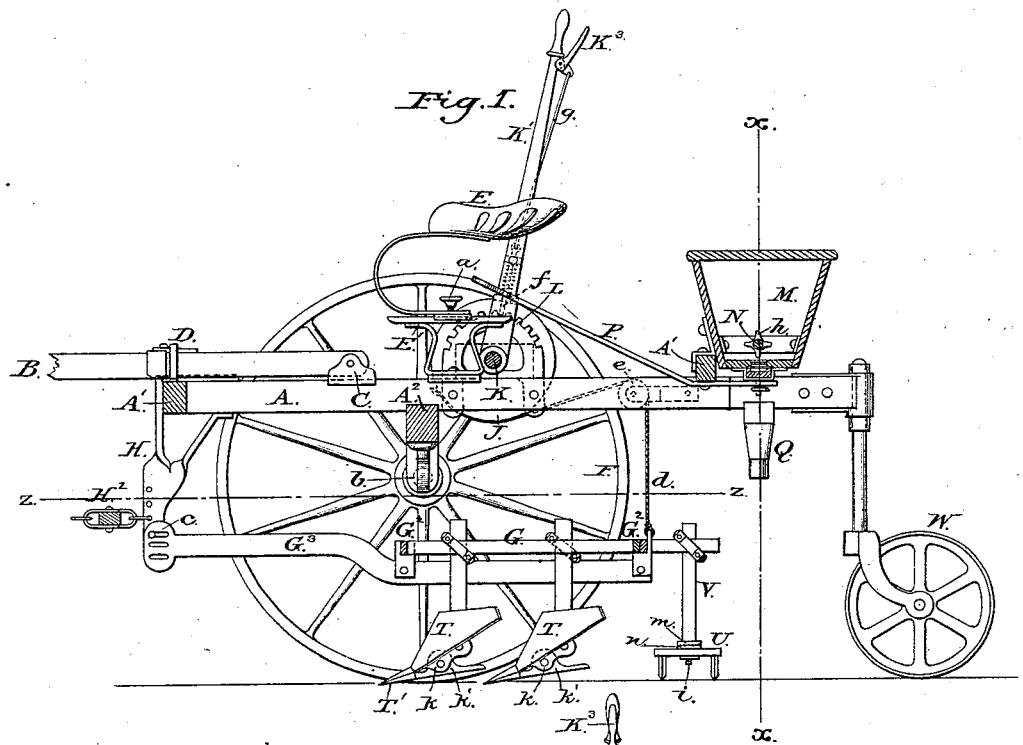
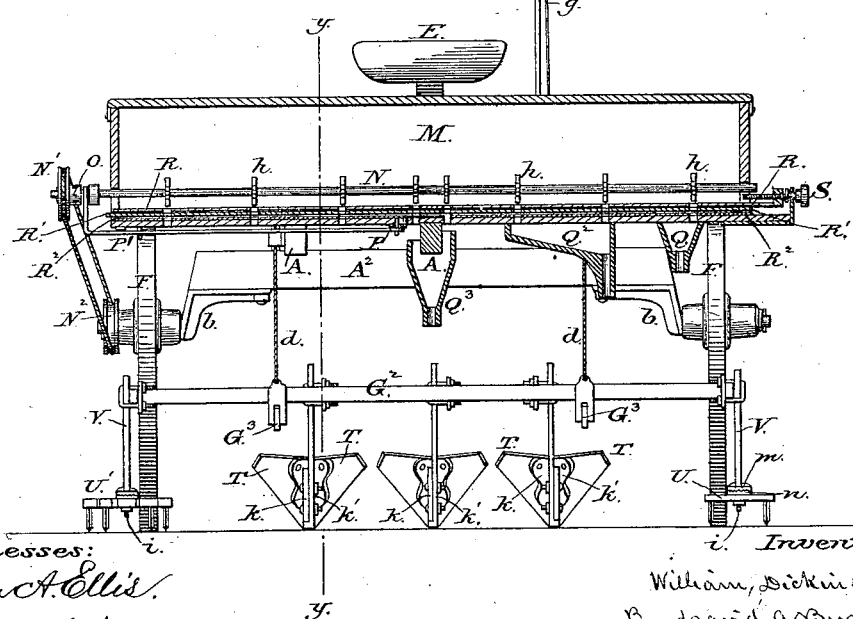
Witnesses:
John A. Ellis
Walter M. Wolfe
Inventor:
William Dickinson
By David Asbury
Attorney.

(No Model.) 2 Sheets—Sheet 2.

W. DICKINSON.
COMBINED SEEDING AND CULTIVATING MACHINE.

No. 282,614. Patented Aug. 7, 1883.

Witnesses:
John A. Ellis.
Walter M. Wolfe

Inventor:
William Dickinson
By David A. Burr
Attorney.

UNITED STATES PATENT OFFICE.

WILLIAM DICKINSON, OF ROCKFORD, ILLINOIS.

COMBINED SEEDING AND CULTIVATING MACHINE.

SPECIFICATION forming part of Letters Patent No. 282,614, dated August 7, 1883.

Application filed January 19, 1883. (No model.)

*To all whom it may concern:*

Be it known that I, WILLIAM DICKINSON, of Rockford, in the county of Winnebago and State of Illinois, have invented a new and useful Improvement in Combined Seeding and Cultivating Machines; and I do hereby declare that the following is a full and exact description thereof, reference being had to the accompanying drawings, and to the letters of reference marked thereon, making a part of this specification.

My invention relates to a combined wheat drill or sower, cultivator, and harrow, and is designed for the better seeding and cultivation of wheat and other grains.

It consists in an improved arrangement and combination, with a suitable draft-frame, of adjustable ridging plows or hoes, a seed-hopper containing improved slides and fitted with improved seed spouts or distributers, and a series of adjustable harrows adapted to be used for after-cultivation of the ground sown by the machine, all as hereinafter fully described.

In the accompanying drawings, Figure 1 is a longitudinal section of my improved combination seeder and cultivator in line $y\,y$ of Fig. 2; Fig. 2, a vertical section in line $x\,x$ of Fig. 1, illustrating different forms of seed-spouts, a portion of them being removed altogether; Fig. 3, a horizontal section in line $z\,z$ of Fig. 1, illustrating the plow-frame and position of plows and harrows, the plows and harrows being interchangeable.

The frame of the machine is constructed, as usual, of longitudinal bars A A A, united by cross-bars A' A' at either end and by the axle $A^2$ in the center.

The tongue B of the machine, pivoted at its rear end between lugs C on the center bar of the frame, extends forward under a strap, D, on the top of the front cross-bar and is detachable.

The spring-seat E is mounted upon a bracket or pedestal, E', upon the center bar in the rear of the tongue, and is made adjustable back and forth upon the pedestal by means of a clasp embracing the upper bar of the pedestal, and which is made fast when adjusted by a set-screw, $a$. The center bar projects rearwardly from the frame to support the seed box or hopper M, and furnish a bearing for the spindle of a large caster-wheel, W, designed to support the rear end of the machine when needed.

The wheels F F, upon which the machine is mainly supported, are fitted to turn upon spindles carried by brackets $b\,b$, projecting from the under side of the axle-bar $A^2$, at either end thereof. (See Fig. 2.)

The plow-frame, consisting of a series of longitudinal bars, G, connected at each end by cross-bars $G^2$, is secured upon two longitudinal beams, $G^3$, whose forward ends are pivoted to brackets or draw-bars H H, depending from the front end of the main frame of the machine. The pivotal connection of the forward ends of the beams $G^3$ with the draw-bars H is effected by means of slotted heads or clevises $c$, whose slots admit of a limited endwise play of the beams upon the pins. A series of these slots are provided, as shown in Fig. 1, to admit of a higher or lower adjustment of the beams, and the heads are forked to embrace the edges of the bars. (See Fig. 3.)

The double-tree $H^2$ is also connected to the draw-bars H H, and admits of vertical adjustment therein. The rear end of the plow-frame is suspended from the main frame by means of cords or chains $d\,d$, which are led over small guide-pulleys $e\,e$ on the sides of the frame to the under side of large take-up pulleys J J upon the ends of a rock-shaft, K, supported in bearings in the rear of the seat, and actuated by a long lever, K', extending upward within easy reach of the driver's hand, when seated. The shaft K is locked in any desired position by means of a spring-actuated bolt, $f$, working upon the side of the lever K', to engage a toothed sector, L, fitted over the shaft by the side of the lever. The bolt is lifted by means of pressure upon a short bent lever, $K^3$, pivoted to the long lever near its handle, and whose shorter arm is connected to the bolt $f$ by a link-rod, $g$.

The cords or chains $d$ are each made fast to the rim of the take-up pulleys J, so that as the pulley is made to rotate in one direction it will draw upon them, and in the opposite direction will serve to slacken them.

The seed-hopper M is secured upon the rear end of the main frame A A' by detachable fastenings, and is made of a length to extend across the entire width of the machine. It is fitted with dropping-apertures at proper intervals, and with agitators $h$ over each, consisting of teeth upon a rotating shaft, N, extending longitudinally through the hopper. The shaft is driven by means of an endless cord or belt led from a loose pulley, N', upon its outer end to a driving-pulley, $N^2$, secured upon the hub of the wheel of the machine on that side. The loose pulley N' is made to engage the shaft N, when required, by a clutch, O, which slides upon a spline on the shaft, and is actuated to and from the pulley by means of a lever, P, pivoted centrally to the under side of the rear bar of the frame A A'. The shorter end of the lever is connected with the clutch by means of a link-rod, P', while its longer end projects forward to within reach of the driver's foot.

The seed-apertures are controlled and adjusted for grain or seeds of different sizes, or for sowing different quantities, by means of three metallic plates, R R' $R^2$, inserted in a groove extending the entire length of the hopper. The seeding-apertures are formed in register through the three plates, but the center plate, R', is alone fixed. The upper plate, R, is made to slide over the center plate by means of an adjusting-screw, S, at one end, and by its movement will close more or less the openings, and serve as a regulator for the feed to determine the amount to be sown per acre. The lower plate, $R^2$, likewise slides longitudinally under the center plate, and is connected directly with the arm of the lever P, actuating the clutch, so that when the lever is thrown over to disengage the clutch O and stop the agitators the slide will be carried over, so as to completely close and cut off the seed-apertures.

Delivery-spouts Q Q are fitted to the bottom of the hopper under each of the apertures. These are readily detachable, and may be either single, as shown at Q in Fig. 2, or double, to cover two apertures, as shown at $Q^2$. As the central bar supporting the hopper will interfere with a central seeding-aperture through the bottom thereof, apertures are cut on each side of the bar, to be controlled by a slide cut-off operated from outside the hopper; but the seed is delivered centrally therefrom by means of a special form of spout, $Q^3$, Fig. 2, adapted to this end. The double spouts $Q^2$ are used where the drills or rows are wide apart, and the single spouts are employed for narrow drills. These spouts are fitted with delivery-tubes (not shown in the drawings) of the accustomed form to carry the seed safely to the ground.

The plows to form the drills or furrows for the reception of the seed are supported by means of suitable arms and detachable fastenings to the longitudinal bars of the suspended plow-frame G G.

The ridging-plows are constructed with double shares T T and detachable points T'. The mold-boards are flat and straight-edged, so as to leave a perfectly triangular well-pulverized furrow, the depth of which is determined by an adjustment of the plow-frame G. These detachable points T', Fig. 1, are constructed with two flat faces placed at an angle with each other to form in effect, when the point is secured in place, an extension of the mold-boards. The points T' are secured in position by means of a recess or socket formed in the inner angle thereof, into which the point formed at the intersection of the mold-boards is inserted, and by offsets $k$ $k'$, projecting, respectively, from the inner side of the mold-boards T and from the inner end of the plow-point T', and which, overlapping each other, (see Fig. 1,) are united and made fast by a transverse bolt.

The rear bar, $G^2$, of the frame G G is extended at each end beyond the frame, so as to carry a plow or a harrow, as may be required, immediately in the rear of each wheel, so that the machine may cultivate the ground fully after its own seeding. The harrows to be used with the machine are constructed either of a single straight bar, U, or of bars U' U', intersecting at an acute angle, and from whose ends the teeth project downward. These bars, working at right angles to the vertical arms V, by which they are to be attached to the frame G, are connected thereto by means of a central pivotal bolt, $i$, upon which the harrow may be turned to adjust it to wide or narrow rows and cover the space between the drills or the entire surface of the ground, as required. To secure the harrows when turned and adjusted radially, corrugated disks $m$ $n$ may be secured, the one to the vertical arm V and the other to the upper face of the harrow U, to be brought into contact with each other when the nut is screwed up upon the bolt $i$. The interlocking of the radial corrugations will serve to prevent the harrow from turning when held up by the nut. The harrows are interchangeable with the plows, and are attached to the frame by clamps in the same manner, but at such points as that they will cultivate the intervals between the seed-furrows first formed by the plows.

Evidently the machine may be constructed with a greater or less number of bars or beams to carry more or less plows or other cultivating devices. The caster-wheel may be dispensed with in working free soils, the seat in such case being moved forward to afford a proper counter-balance. The tongue is left yielding when the caster-wheel is used; otherwise it is made rigid.

Various forms of plows or loose hoes may be secured to and operated by means of the suspended plow-frame, so that the machine is adapted for tilling the ground for a variety of crops. Scatter-boards may be suspended under the seeding-apertures in place of the spouts Q for broadcast sowing, the spouts being readily detached from the hopper for the purpose.

In the use of my machine the drill-furrows are opened by the plows T, whose form is adapted to the character of grain to be sown, and which are set at intervals apart determined by the bars of the plow-frame, the plows or hoes being suspended from every bar for narrow drills, and from each alternate beam for wider rows. The quantity of seed to be sown per acre having been determined, the seed-openings in the hopper are adjusted by means of the upper slide and the set-screw S operating it to deliver that quantity. Where narrow drills are formed, the single spouts Q are fixed under each aperture. Where wide rows are required, the double spouts $Q^2$ are substituted. The space between the rows in the rear of the wheels is cultivated by means of the harrows U U, carried upon the lateral wings or extension of the rear bar of the frame. After seeding, the machine may be used in cultivating and harrowing the growing crop, the several cultivating-tools being set and adjusted, as described, to till the soil fully without disturbing the young plants. Thus the machine will not only do the seeding equally as well as, if not better than, other machines in use, but will also prove of great service in thereafter cultivating with hoe and harrow the grain which has been sown therewith.

I am aware that harrows have been constructed in the form of a wheel made to rotate in a plane parallel with the surface of the ground and armed with teeth projecting parallel with its axis; but the width of such harrow must remain invariably the same, being determined by the diameter of the wheel. The harrows which are adapted to my machine and constitute part of my invention differ from said wheel-harrows, in that, being constructed with a single main horizontal bar, with or without a shorter transverse bar, they admit of an adjustment as to the width of the path to be followed by changing the angle of said bar.

I claim as my invention—

1. The within-described seeding and cultivating machine, constructed of a supporting-frame, A, axle $A^2$, and wheels F, a plow-frame, G, suspended from the main frame by means of brackets H and adjustable heads $c$, to form an adjustable yielding joint at the front end, and by cords $d$, controlled by a lever, K', rock-shaft K, and pulleys J, permitting an adjustment at the rear end, a seed-hopper, M, supported at the rear end of the main frame, an agitator-shaft, N, within the hopper, rotated by means of a bolt extending from a loose pulley, N', on the end of the shaft to a driving-pulley, $N^2$, on the hub of the wheel, a longitudinal seed-slide, R, actuated by a set-screw to adjust the feed, a second slide, $R^2$, actuated by a foot-lever, P, to cut off the feed, a clutch, O, actuated by same lever to engage or disengage the loose pulley and agitator-shaft, and detachable plows and adjustable harrows carried by the plow-frame, all substantially in the manner and for the purpose herein set forth.

2. The combination, in a seeding and cultivating machine, with its frame A, the bracket H, dependent from the end of the frame in front of the axle, and a secondary adjustable tool-carrying frame, G, pivoted at its front end directly to the brackets by means of a slotted clevis, $c$, permitting a longitudinal play of the frame, of the suspension-chains $d$, dependent from the main frame in rear of the axle to support the rear end of the tool-frame, and the pulleys J J, actuated by the rock-shaft K and lever K', and adapted to take up or let out said chains, and thereby elevate or depress the rear end of the tool-frame, substantially in the manner and for the purpose herein set forth.

3. In combination with the tool-carrying frame of a seeding and cultivating machine, the harrows U, each constructed with a long toothed bar pivoted to the lower end of an upright supporting-bar, V, carried by said frame, and adapted to rotate in a plane transverse to said bar for adjustment to work in a wider or narrower path, substantially in the manner and for the purpose herein set forth.

4. The combination, in a seeding and cultivating machine, with the adjustable tool-frame G, adapted to support and carry a gang of plows or hoes, of a series of separate harrows, U U, supported and adjusted upon the ends of bars V, dependent from said frame, for the after-cultivation of the soil in the wheel-tracks, and in the intervals between the drills formed by said plows or hoes and seeded by the drill-tubes, substantially in the manner and for the purpose herein set forth.

In testimony whereof I have signed my name to this specification in the presence of two subscribing witnesses.

WM. DICKINSON.

Witnesses:
J. L. WINNIE,
A. H. BESSEY.